UNITED STATES PATENT OFFICE.

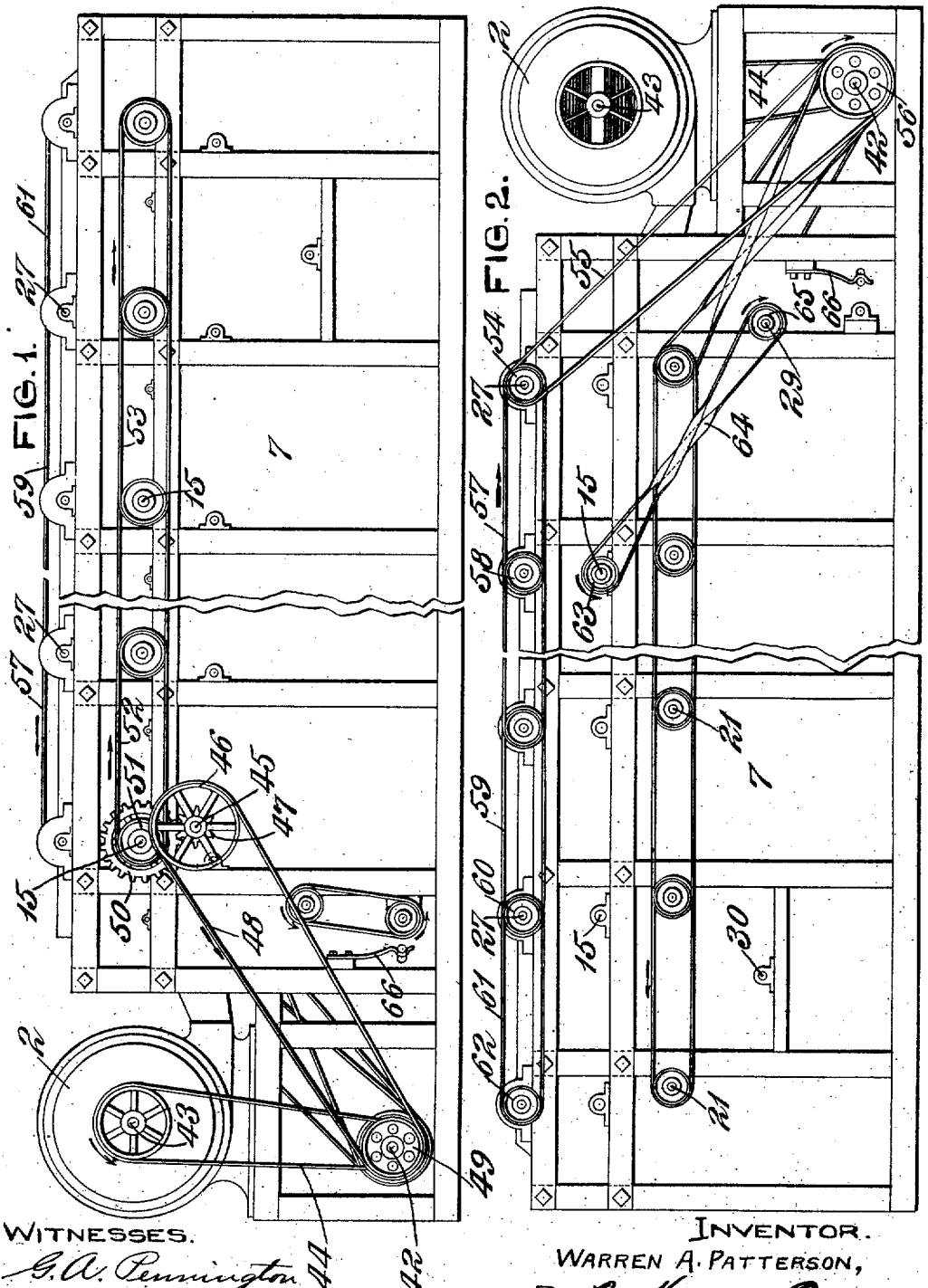

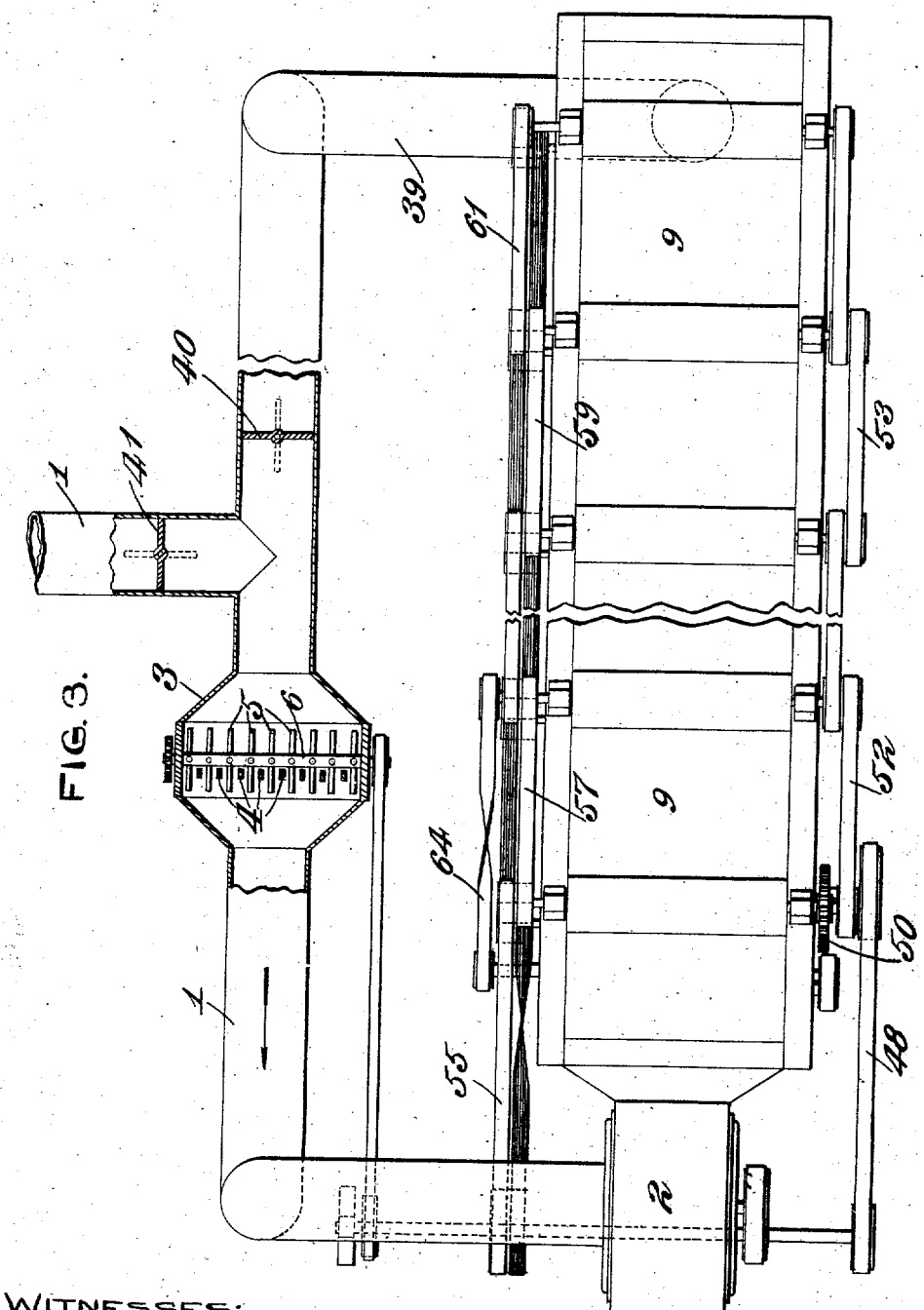

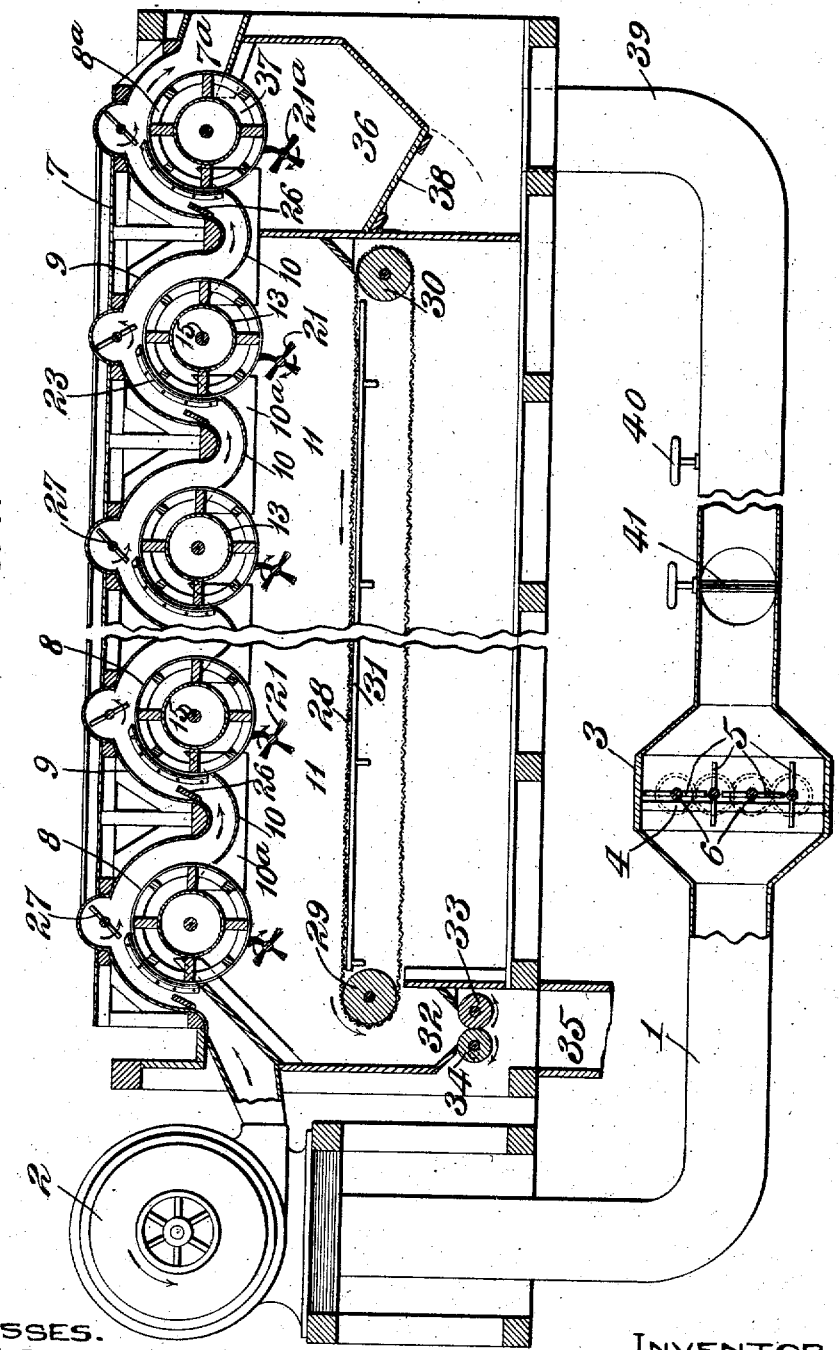

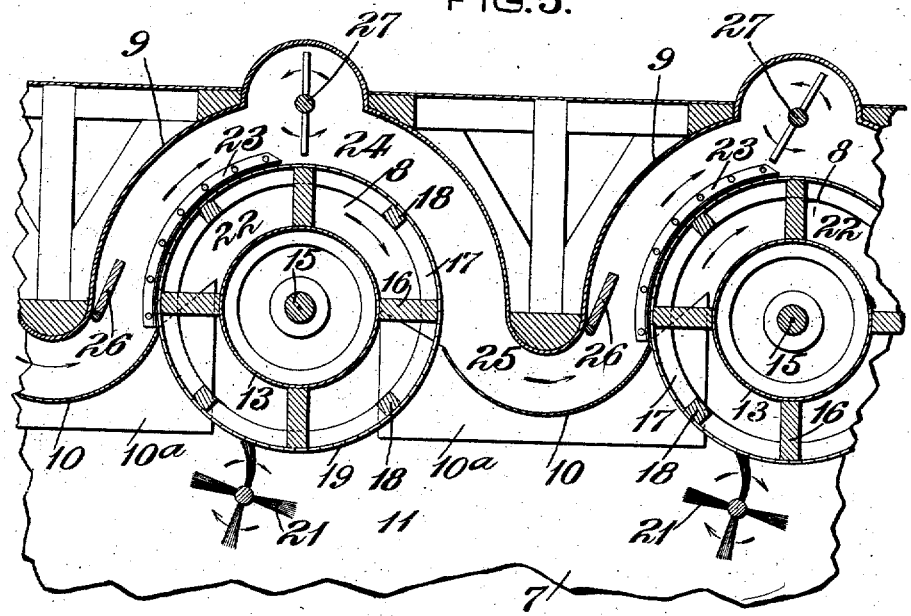
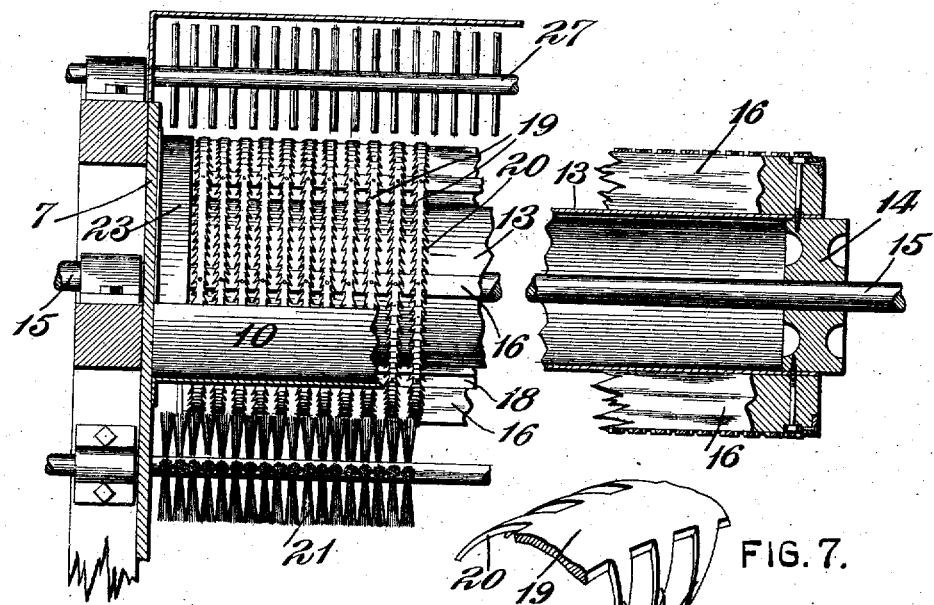

WARREN A. PATTERSON, OF ST. LOUIS, MISSOURI, ASSIGNOR TO AMERICAN COTTON SEPARATOR COMPANY, OF ST. LOUIS, MISSOURI, A CORPORATION OF OKLAHOMA TERRITORY.

COTTON-SEPARATOR.

No. 853,470.     Specification of Letters Patent.     Patented May 14, 1907.

Application filed September 8, 1905. Serial No. 277,622.

*To all whom it may concern:*

Be it known that I, WARREN A. PATTERSON, a citizen of the United States, residing at St. Louis, Missouri, have invented a certain new and useful Improvement in Cotton-Separators, of which the following is a full, clear, and exact description, such as will enable others skilled in the art to which it appertains to make and use the same, reference being had to the accompanying drawings, forming part of this specification, in which—

Figure 1 is a side elevational view of a cotton separator constructed in accordance with my invention; Fig. 2 is a side elevational view of a cotton separator showing the system of belting on the side opposite to that illustrated in Fig. 1; Fig. 3 is a top plan view of the cotton separator, the agitator being illustrated in section as well as part of the conveyer tubing; Fig. 4 is a vertical longitudinal sectional view through the cotton separator; Fig. 5 is an enlarged detail fragmentary sectional view through a part of the separator; Fig. 6 is a fragmentary view of one of the separator cylinders and its appurtenances, part of said cylinder being shown in elevation and part in section; and Fig. 7 is a fragmentary perspective view of one of the lint-engaging bands.

This invention relates to an improvement in machines for treating cotton, one of the objects being to facilitate the removal of the cotton from the bolls preparatory to ginning it.

In practicing the ordinary method of picking the cotton by hand, the cotton is removed from the pod or boll in the fields. This is a tedious and slow method, having many disadvantages well recognized by those skilled in the art.

It is the purpose of my invention to provide a machine which is capable of mechanically removing the cotton from the pod after the pod has been separated from the plant.

It is also the purpose of my invention to provide means whereby the pods, leaf-trash, motes and other foreign matter may be worked over so as to save all of the lint.

Other objects and advantages as well as the novel details of construction of this invention will be specifically described hereinafter, it being understood that changes in form, proportion and minor details of construction may be resorted to without departing from the spirit of my invention or sacrificing any of the advantages thereof.

In order to convey a definite idea of the preferred form of my invention, I will describe the various steps of the process carried out thereby in their proper sequence as well as the mechanism whereby the steps are accomplished. The cotton is first picked from the plant with the bolls thereon and introduced into a pneumatic conveyer tube 1, in the path of which is a suction fan or blower 2. In the path of the tube is an agitator casing 3 communicating with said tube and having therein a grid comprising spaced bars 4 between which pass a plurality of oppositely rotatable fingers 5 on agitator shafts 6. The fingers are so arranged that the arcs of rotation of the free ends of one set of fingers overlap the arcs of rotation of the fingers on the adjacent agitator shaft. This boll agitator may, or may not, be employed, but where employed, the bolls will be forced against the grid in such a manner that the fingers will subject them to a severe threshing, whereby the outside covering or boll-pod will be loosened from around the cotton. The blower 2 communicates with a casing 7 in which are a plurality of separator cylinders 8 spaced suitable distances apart in the casing 7 and arranged transversely thereof, the peripheries of said cylinders being preferably parallel with the top 9 of said casing. Between the respective cylinders are partitions 10 constituting mote-boards, which partitions serve a dual purpose. They not only act as mote-boards to receive the leaf-trash, dust, bolls, and such like foreign substances which have been removed from the cotton, but they also serve the purpose of partitioning off the air blast so as to provide a dead chamber 11 within the casing 7 and below the cylinders. These mote-boards preferably consist of concavo-convex body portions having right angularly disposed flanges $10^a$ which are secured to the respective sides of the casing 7, the ends of said flanges extending within the peripheries of the respective cylinders 8.

One of the cylinders is illustrated in detail in Fig. 6, each cylinder being a counterpart of the other. The preferred form of each cylinder consists of a hollow shell 13 closed at the ends by fillers 14, through the axes of each of which is a shaft 15 journaled in the sides of the casing 7. Equi-distantly arranged around the cylindrical shell 13 are spacing or nailing strips 16 which run longitudinally of the cylindrical portions 13 but transversely of the machine, the ends of the strips being short of the ends of the fillers 14 to leave a space between the ends of the cylinders and the sides of the casing, as will be presently explained. Secured to the nailing strips 16 are rings 17 between which are stiffeners or bracers 18 interposed between the nailing strips 16, and fastened to the nailing strips 16 and the bracers 18 are the plurality of spaced bands 19 having prongs 20 inclined inwardly from the respective edges of the bands 19 so as to receive the lint as it is blown onto the cylinders 8. These projections or prongs may be of different forms but I prefer to arrange them in the form of serrations, as indicated. By this arrangement the cotton with the bolls or pods will be forced against the pronged bands so that a current of air will pass between the bands permitting the bands to act as a grid so that while the leaf-trash, motes, dust and other foreign substances will be forced over the grid formed by the bands, the lint will adhere to the prongs to be subsequently brushed off by the brushes 21 in the dead chamber. The air which passes between the bands 19 and the hollow shell 13 may exhaust at the end of the cylinders 8 and pass out between the space formed by shortening the ends of the nailing strips 16 so that a suction will be set up in the spaces 22 in the cylinders 8. Of course, some of the air will exhaust through the spaces formed between the bands but this will not affect the utility of the device.

In order that the cotton will not be blown between the ends of the cylinders 8 and the sides of the casing 7 I have provided baffles in the form of arcuate angles 23 which will protect the front portions of the spaces and direct the cotton onto the grid formed by said bands 19. Inasmuch as the top of the casing is parallel with the peripheries of each of the separator cylinders 8, separator chambers 24 are formed adjacent to each of the cylinders and each separator chamber has an inlet opening 25. At the inlet opening of each separator chamber is a valve 26 which may be operated from the exterior so as to govern the supply of air and cotton into the separator chambers 24. Immediately above each cylinder 8 is a boll remover 27 comprising a shaft having a plurality of diametrically oppositely disposed teeth, and below the partitions 10 and within the dead chamber, are the cotton removing devices illustrated as the brushes 21 which are secured to shafts driven by appropriate means. Below the respective cylinders, and within the dead chamber, is a conveyer comprising an endless belt 28 passing over rollers 29 and 30 at the respective ends of the conveyer and over intermediate supporting devices 31. At the discharge end of the conveyer is a hopper 32, the bottom of which is closed by parallel rollers 33 and 34, the latter being a yielding roller having a tendency to rest against the former, but which may be separated by the cotton as it passes through said hopper into a chute 35 immediately beneath the same, and from where it may be conveyed to a suitable premises provided for its reception.

36 designates an accumulator receptacle at the end of the casing 7 remote from the blower 2. The floor of the receptacle is provided with the hinged portion comprising a valve 38 which may be dropped in the position indicated in dotted lines, to permit the accumulated cotton to drop onto the floor of casing 7 and pass into the conveyer tube 1 through the branch tube 39, which projects into the casing 7 through an opening in the floor thereof, said branch tube 39 being provided with a valve 40 similar to the valve 41 in the tube 1. A rotatable separator cylinder $8^a$ similar to the one designated by the reference numeral 8, is located partially in the casing 7 and partially in the accumulator receptacle 36, and this cylinder $8^a$ receives some of the bolls and part of the cotton as it is blown out through the discharge opening $7^a$ at the end of the casing. The cotton and bolls which pass onto the teeth of the roller $8^a$ are removed by the brush $21^a$ which throws them into the accumulator receptacle 36.

In actual practice, I prefer to have the first cylinder 8 move at a comparatively slow speed while the remaining ones move at a faster speed. In every instance, however, the removing brushes 21 will be rotated at a relatively greater speed than the cylinders 8, this being desirable on account of the fact that I prefer to have the brushes 21 rotate in the same direction as the cylinders 8, and by rotating them more rapidly the cotton may be removed without tearing the lint.

42 designates a drive shaft which may receive its power from any suitable source, and 43 is the drive shaft of the blower. A belt 44 passes over pulleys on the drive shaft 42 and the drive shaft 43 whereby the fan will be rotated. On a stub shaft 45 is a pulley 46 and a pinion 47. A belt 48 passes over the pulley 49 on the shaft 42 and over the pulley 46 on the shaft 45 so that the rotation of the drive shaft 42 will impart rotation to the shaft 45. The pinion 47 will impart motion to a gear 50 in mesh therewith, which gear is on one of the shafts of one of the cylinders 8. Each shaft 15 on each cylinder 8 projects through the casing and carries a pulley 51, the intermediate shaft carrying two of these. A belt 52 passes over a pulley on the intermediate shaft; a belt 53 passes over a pulley on the intermediate shaft and over a pulley on the last-named shaft so that the rotation of the gear wheel 50 will, through the medium of the belts 51 and 52, impart motion to all of the shafts 15.

54 designates a pulley on the shaft of the first beater 27, around which pulley passes a belt 55 also passing around a pulley 56 on the drive shaft 42. A belt 57 passes over the pulley 54 and over a pulley 58 on one of the intermediate beater shafts, and a belt 59 passes over the pulley 58 and over a pulley 60 on another intermediate beater shaft, and a belt 61 passes over the pulley and over a pulley 62 on the last beater shaft. Projecting through the side of the casing opposite to the pulley 46 and its accessories is one end of the shaft 15 which has thereon a pulley 63, around which passes a belt 64 passing over a pulley 65 on one end of the shaft in the roller 29 so that said roller will be rotated to drive the conveyer 28. A spring 66 provides a resilient bearing for the movable roller 34 which co-operates with the roller 33 to close the hopper opening. The boll removers in the agitator casing 3 may be driven in any suitable manner, preferably by means of a pulley connected to the shaft 6 and driven by a belt which passes over a pulley, and in order to avoid confusion no detailed arrangement of gearing is here illustrated.

It being assumed that all of the parts are properly assembled for proper operation, the steps carried out by the machine for cleaning the cotton will be substantially as follows: The valve 40 will be closed and the valve 41 opened. By rotating the shaft 42 all of the co-operating parts of the machine will be started in operation and the blower will suck in the cotton through the tube 1, and in the event that the agitator is utilized, the bolls will strike against the grid comprising the bars 4 and it being understood that the agitators will be driven by appropriate mechanism, the bolls will be agitated by the revolving beaters so as to loosen the pod-covering or bolls which will then be drawn in through the blower and introduced into the casing 7. The force of the blower will cause the cotton to intimately contact with the projections on the first cylinder 8, which cotton will be caused to adhere to the projections on said cylinder and as the first cylinder continues to rotate the first beater 27 will come in contact with the mass of cotton and foreign matter, and as it is intended to rotate the beaters at a comparatively greater speed than the cylinders 8, a threshing action will be exerted against the mass. The speed at which the beaters rotate compared to the speed of rotation of the cylinders 8 is about 30 to 1. That is to say, the cylinders will preferably be arranged to rotate at about fifty revolutions per minute, while the speed of rotation of the beaters will be about 1500 per minute. As the mass is subjected to the action of the first beater most of the foreign matter will be removed therefrom and pass onto the partition and mote-board 10. The cotton which is held fast to the projections on the bands on the first cylinder 8 will be carried past the mote-board 10 into the dead chamber 11 where it will be removed by the first brush 21 and dropped onto the constantly moving conveyer 28. A succession of these operations will be continued depending upon the number of cylinders 8 and the complementary parts arranged in the casing 7 until the leaf-trash, motes and other foreign substances are caught by the cylinder $8^a$ and carried into the accumulator casing. In each instance, some of the cotton will adhere to the cylinder and be removed by one of the brushes 21.

By reference to Figs. 4 and 5, it will be observed that a tortuous passageway is provided through which the cotton may be blown and that the separating action of the cotton takes place as it passes through this tortuous passageway. As soon as the cotton has been deposited upon the conveyer 28 it will be carried off and deposited in the hopper 32 and discharged through the bottom thereof, normally closed by the companion rollers 33 and 34. If, for any reason, it is found desirable to work over the leaf-trash so as to save any of the lint contained therein, the valve 41 will be closed and the valve 40 opened without disturbing any other mechanism of the machine, and the manipulations of the valves thus described will cause the leaf-trash to pass through the branch tube 39 around into the machine and then through the tube 1 where it may be reworked any number of times so as to save all of the lint.

Attention is called to the fact that the bolls from which all of the cotton has been removed, may be forced out through the opening $7^a$ and the trash containing particles of lint only will be introduced into the receptacle 36 by the roll $8^a$. Thus, a large percentage of leaf-trash, bolls, hulls, etc. which enter the machine will be forced out through the opening $7^a$ as it will not be necessary nor desirable to re-work this material.

Having thus described my invention, what I claim as new and desire to secure by Letters Patent is:

1. A cotton separator cylinder comprising a cylindrical core, longitudinal spacing pieces arranged about the periphery of the core, and bands encircling the core and connected to said spacing pieces, said bands being spaced apart and having lint-receiving projections; substantially as described.

2. In a cotton separator, the combination with a casing having a tortuous passage for the passage of the cotton, cylinders in said casing and in the path of the tortuous passage, spaced bands forming parts of the cylinders, said cylinders terminating short of the sides of the casing, and baffles connected to the sides of the casing and overlapping the ends of the cylinders; substantially as described.

3. In a cotton separating machine, a casing, cylinders in said casing mounted in fixed bearings and having spaced bands around their peripheries provided with edge projections, partitions between the cylinders to provide a separating chamber and a receiving chamber, the cylinders being movable in both chambers so that the cotton which is deposited on the cylinders in the separating chamber will be carried to the receiving chamber, and means for removing the cotton from the cylinders in the receiving chamber; substantially as described.

4. A cotton separator comprising a casing divided into a separating chamber and a receiving chamber, separating cylinders in said casing having their peripheries movable within the separating chamber and receiving chamber, said cylinders having slots in their peripheries, the edges of the slots being provided with projections, means for introducing an air blast through the slots within the cylinders, said cylinders having their ends spaced away from the sides of the casing, and baffles connected to the sides of the casing and overlapping the ends of the cylinders; substantially as described.

In testimony whereof, I hereunto affix my signature, in the presence of two witnesses, this second day of September 1905.

WARREN A. PATTERSON.

Witnesses:
B. F. FUNK,
GEORGE BAKEWELL.